Jan. 31, 1928.  
E. C. AMSDEN  
1,657,448  
METHOD OF MAKING TIRE CARRIERS FOR AUTOMOBILES  
Original Filed Nov. 30, 1925   2 Sheets-Sheet 1
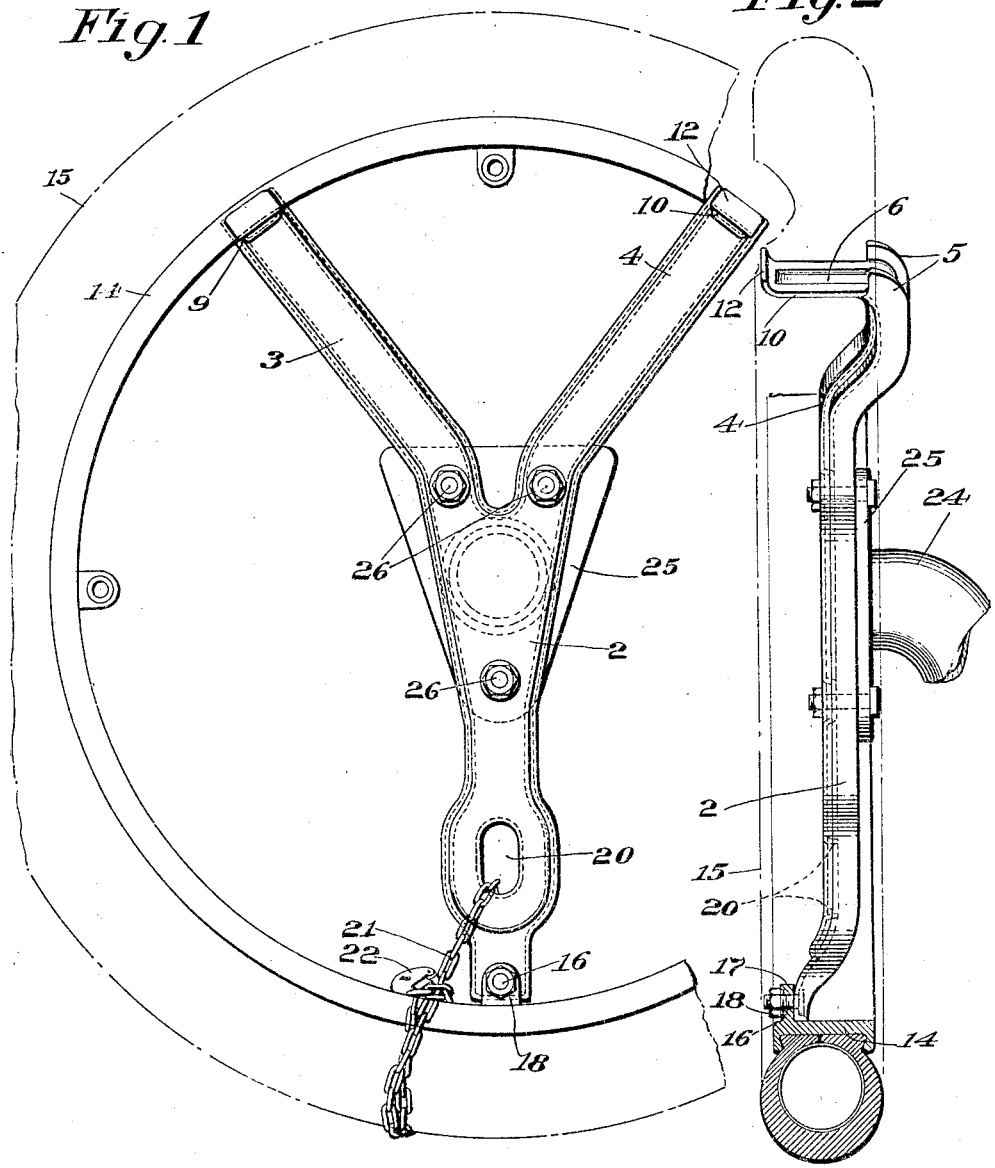
INVENTOR.  
Eugene C. Amsden  
BY J. H. McCready  
ATTORNEY.

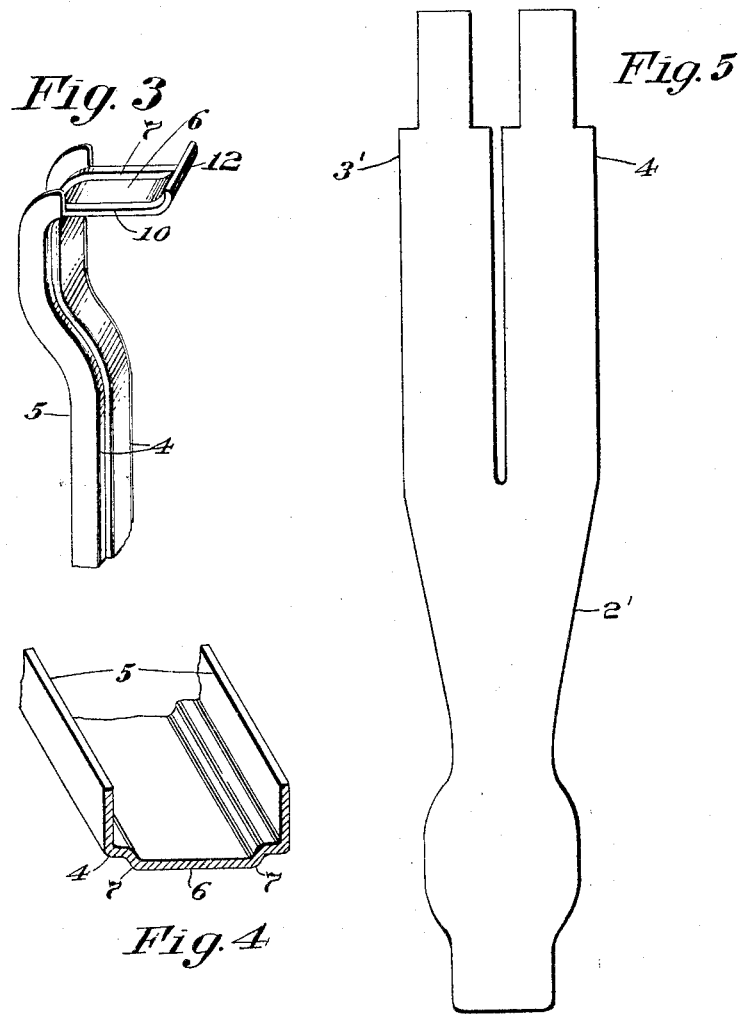

Patented Jan. 31, 1928.

1,657,448

UNITED STATES PATENT OFFICE.

EUGENE C. AMSDEN, OF BOSTON, MASSACHUSETTS, ASSIGNOR TO AMSDEN & BARNARD, INC., OF BOSTON, MASSACHUSETTS, A CORPORATION OF MASSACHUSETTS.

METHOD OF MAKING TIRE CARRIERS FOR AUTOMOBILES.

Application filed November 30, 1925, Serial No. 72,198. Renewed April 1, 1927.

This invention relates to spare tire carriers for automobiles.

It is the chief object of the invention to improve the methods of manufacturing devices of this character with a view both to reducing the expense of manufacture and also producing a superior article.

The nature of the invention will be readily understood from the following description when read in connection with the accompanying drawings, and the novel features will be particularly pointed out in the appended claims.

In the drawings,

Figure 1 is a front elevation of a tire carrier constructed in accordance with this invention;

Fig. 2 is a side view of the carrier shown in Fig. 1;

Figs. 3 and 4 are perspective views of portions of one of the arms of the tire carrier shown in Figs. 1 and 2; and Fig. 5 is a plan view of a sheet metal blank from which the carrier may be made.

The tire carrier shown comprises a Y-shaped support consisting of an upright body or trunk 2 and two arms 3 and 4 which are integral with, and project from, the upper end of the part 2. Both the arms and the body are provided with flanges extending along the opposite edges thereof so that each of these parts is channel shaped in cross-section, as clearly shown in the drawings, the flanges on the arm 4 being indicated at 5 in Figs. 3 and 4. Preferably, also, a rib or longitudinal depression 6 is formed along the central part of the arm 4 so that the curved portions 7—7 of the arm also form stiffening flanges. The arm 3 and body 2 are similarly shaped.

The upper portions of the arms are reversely bent, as best shown in Figs. 2 and 3; that is, they are bent backwardly and then forwardly again, thus forming substantially horizontal sections or members 9 and 10, respectively, at the upper ends of the arms, these tips lying at approximately right angles to the main portions of the arms. The flanges 5—5 extend rearwardly and terminate at the tips, but it is preferable to run the channel shaped depressions 6 through the tips, as shown in Figs. 2 and 3, for the purpose of stiffening them. The extremity of each tip also is turned upwardly, as shown at 12. These tips are thus shaped to receive and support the rim 14 on which the spare tire 15 is mounted, the rim simply resting on the parts 9 and 10.

In order to secure the rim to the lower extremity of the body 2, a bolt 16 is welded or otherwise secured rigidly in this part where it will pass through an ear or lug 17 which is secured fast to the rim 14. A nut 18 threaded on this bolt secures this ear firmly in place.

For the purpose of facilitating the locking of the tire to the carrier, the body 2 is bulged laterally at an intermediate point and an aperture 20 is formed through this bulged portion, this aperture being sufficiently large to receive a chain 21 which is wrapped around the tire and then secured by the padlock 22 in the customary manner.

The carrier shown is designed especially for the Ford car and it is supported on the car by a bracket 24 with which the car is equipped, this bracket including a plate 25 against which the carrier fits. Three bolts 26 secure the central part of the carrier firmly to the bracket 24—25. Other means for mounting the carrier may however be used.

According to the preferred process of making the carrier a blank of the form shown in Fig. 5 is cut or punched from sheet metal. This blank comprises a body portion 2' with two parallel arms 3' 4' projecting from one end thereof. This entire piece may be cut from narrow strip stock, or it may be blanked out of sheet stock. Flanges are next formed along the opposite edges of each arm and at the opposite edges of the body, thus making U-shaped or channel sections in each of these parts. At this time, also, the ribs 6 may be formed. The arms next are bent laterally away from each other in directions parallel to the plane of the blank until they are brought into substantially the relationship shown in Fig. 1. This lateral bending takes place in the plane of the web portion of each arm, but it is readily done with the aid of suitable dies. This bending operation produces the Y-shaped construction above described, the three limbs of the carrier radiating from a common point. Next, the end portions of the arms are reversely bent, as above described, to produce the rim supporting sections or members 9 and 10, and the outward curve in the lower part of the body 2 is formed. The holes for the bolts 26 and 16 are then punched, and the bolt 16 is set in place and secured, preferably by welding. This completes the manufacture of the carrier. It will be understood that the exact sequence of these operations may be changed and that certain of the operations may be combined, considerable latitude in this respect being permissible.

This process has the advantage of being extremely economical of stock, as will readily be appreciated by those skilled in the punch and die art, due to the fact that the blank may be cut from narrow strip stock. If the blank is cut out of sheet stock it is initially very narrow so that the stock cuts economically, the arms subsequently being bent or spread apart to produce the Y-shaped construction. The character of the dies required to perform the operations above described will be evident to those familiar with such processes from the foregoing description of the steps in the process. A one-piece construction thus is provided by simple punch and die methods and from a piece of stock of such a shape that waste is reduced to a minimum.

It will be observed that the carrier itself requires only one assembling operation, namely, that of welding or otherwise securing the bolts 16 to the part 2. This fact, together with the fact that waste stock is almost completely eliminated, makes the carrier very economical indeed to manufacture. Since the only joints in the entire assembly, including the bracket, are those between the carrier and the bracket, and between the bolt 16 and the carrier, any opportunity for the development of play or looseness in the structure is practically eliminated, particularly since the bolt 16 preferably is welded in place and the ends of the bolts 26 may be headed or riveted over after the carrier has been secured to the bracket. A strong sturdy construction thus is provided, which is neat in appearance, is superior to the assembled carriers commonly used heretofore, and is much cheaper than the carriers blanked to shape which have been used to some extent.

While I have herein shown and described the best embodiment of my invention that I have so far devised, it will be evident that the invention may be embodied in other forms without departing from the spirit or scope thereof. A typical construction has been described and illustrated, but it will be obvious that the process is equally applicable to the manufacture of other carriers, the features of spreading the arms and shaping them being valuable in a great variety of carrier constructions.

Having thus described my invention, what I desire to claim as new is:

1. That improvement in the process of making tire carriers which consists in cutting from flat sheet metal stock a blank having a body portion with two substantially parallel arms projecting from one end thereof, flanging the edges of said arms, subsequently spreading the outer ends of said arms apart in directions substantially parallel to the plane of the blank, and thereby producing a part having three limbs radiating from a common point, and providing a plurality of said limbs with tire supporting members.

2. That improvement in the process of making tire carriers which consists in cutting from flat sheet metal stock a blank having a body portion with two substantially parallel arms projecting from one end thereof, said blank being narrower across said body than across said arms, making flanges along the edges of said arms and said body, subsequently spreading the ends of said arms apart in directions approximately parallel to the plane of the blank and thereby providing a member having three flanged limbs radiating from a common point, and shaping a plurality of said limbs to provide integral tire supporting members thereon.

3. That improvement in the process of making tire carriers which consists in making from flat sheet metal stock a blank having a body portion with substantially parallel arms extending from one end of said body portion, making flanges along the edges of said arms, and subsequently, while the metal is at ordinary temperature, bending said arms away from each other in directions approximately parallel to the plane of the blank and providing said arms with tire supporting members.

4. That improvement in the process of making tire carriers which consists in providing a sheet metal blank having a body portion with substantially parallel arms extending from one end thereof, flanging the opposite edges of each of said arms and thereby producing a channel section in each arm, subsequently bending said arms away from each other in substantially the plane of the web portions of said channel sections, and reversely bending portions of said arms to form integral tire supporting members thereon.

5. That improvement in the process of making tire carriers, which consists in providing a sheet metal blank having a body portion with substantially parallel arms extending from one end thereof, flanging said arms, bending said arms away from each other in directions substantially parallel to the plane of the blank and thereby forming a Y-shaped member, and shaping the end portions of said arms to form tire supporting sections thereon integral with the arms.

6. That improvement in the process of making tire carriers, which consists in providing a sheet metal blank having a body portion with substantially parallel arms extending from one end thereof, flanging said body and arms to produce a channel section in each of said parts, subsequently bending said arms away from each other in directions substantially parallel to the plane of the blank and thereby forming a Y-shaped member, and reversely bending portions of said arms to form tire supporting sections extending at substantially right angles to the main portions of the arms.

EUGENE C. AMSDEN.